US012753103B2

(12) United States Patent
Dupeux et al.

(10) Patent No.: US 12,753,103 B2
(45) Date of Patent: Oct. 6, 2026

(54) PREPARATION OF A RAW MATERIAL COMPOSITION

(71) Applicant: SAINT-GOBAIN ISOVER, Courbevoie (FR)

(72) Inventors: Guillaume Dupeux, Paris (FR); Alexandre Martin, Montlignon (FR); Guillaume Barba Rossa, Compiegne (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 182 days.

(21) Appl. No.: 18/246,374

(22) PCT Filed: Sep. 23, 2021

(86) PCT No.: PCT/FR2021/051638
§ 371 (c)(1),
(2) Date: Mar. 23, 2023

(87) PCT Pub. No.: WO2022/064150
PCT Pub. Date: Mar. 31, 2022

(65) Prior Publication Data

US 2023/0391653 A1 Dec. 7, 2023

(30) Foreign Application Priority Data

Sep. 24, 2020 (FR) ....................................... 2009691

(51) Int. Cl.
*C03B 1/00* (2006.01)
*C03B 3/00* (2006.01)

(52) U.S. Cl.
CPC ................ *C03B 1/00* (2013.01); *C03B 3/005* (2013.01)

(58) Field of Classification Search
CPC ........... C03B 1/00; Y02P 40/50; C03C 1/002; C03C 13/06
See application file for complete search history.

(56) References Cited

U.S. PATENT DOCUMENTS 4,678,493 A 7/1987 Roberts et al.
8,082,760 B2 12/2011 Hansen
(Continued)

FOREIGN PATENT DOCUMENTS

DE 4122334 A1 * 1/1993 ............... B09B 3/32
EP 0625485 A1 * 11/1994
(Continued)

OTHER PUBLICATIONS

Berniers et. al., EP0625485A1 English Translation Description v1, Nov. 23, 1994, Espacenet, p. 4, 7; translated Mar. 14, 2025 (Year: 1994).*
(Continued)

*Primary Examiner* — Cameron K Miller
(74) *Attorney, Agent, or Firm* — CUSHMAN PARTNERS LLC

(57) ABSTRACT

A method for preparing a raw material composition adapted to be fed into the melting chamber of a facility adapted to obtain cullet, glass wool and/or rock wool, textile glass yarns, flat glass and/or hollow glass, the method including grinding a mineral wool mixture adapted to enter into the raw material composition, such that the granular mixture obtained after grinding has a bulk density greater than or equal to 30 $kg/m^3$.

29 Claims, 1 Drawing Sheet

(56) References Cited

U.S. PATENT DOCUMENTS

| | | | | |
|---|---|---|---|---|
| 2007/0191204 | A1* | 8/2007 | Bohrt | C03B 37/045 501/36 |
| 2008/0256981 | A1* | 10/2008 | Jacques | C03B 3/026 65/19 |
| 2017/0368584 | A1 | 12/2017 | Demott et al. | |

FOREIGN PATENT DOCUMENTS

| | | | | | |
|---|---|---|---|---|---|
| EP | 1 771 391 | B1 | | 2/2012 | |
| JP | 2003278066 | A | * | 10/2003 | |
| JP | 2007-501765 | A | | 2/2007 | |
| JP | 2008-508174 | A | | 3/2008 | |
| JP | 2011-011975 | A | | 1/2011 | |
| JP | 2011-518099 | A | | 6/2011 | |
| JP | 2017-520505 | A | | 7/2017 | |
| KR | 100839198 | B1 | * | 6/2008 | C03B 37/00 |
| UA | 89259 | C2 | | 1/2010 | |
| WO | WO2000076929 | A1 | * | 12/2000 | |
| WO | WO 2006/040135 | A1 | | 4/2006 | |

OTHER PUBLICATIONS

DE4122334A1 machine translation (Year: 1993).*
EP0625485A1 machine translation (Year: 1994).*
KR100839198B1 machine translation (Year: 2008).*
JP2003278066A machine translation (Year: 2003).*
International Search Report as issued in International Patent Application No. PCT/FR2021/051638, dated Feb. 4, 2022.
Third Office Action as issued in Chinese Patent Application No. 202180064874.1, dated Mar. 6, 2026.
Balsubramanian, A., "Overview of Mineral Processing Methods," Aug. 2015, pp. 1-13.
Office Action as issued in Japanese Patent Application No. 2023-516573, dated Aug. 5, 2025.
Office Action as issued in Ukrainian Patent Application No. a202301675, dated Jul. 31, 2026.

* cited by examiner

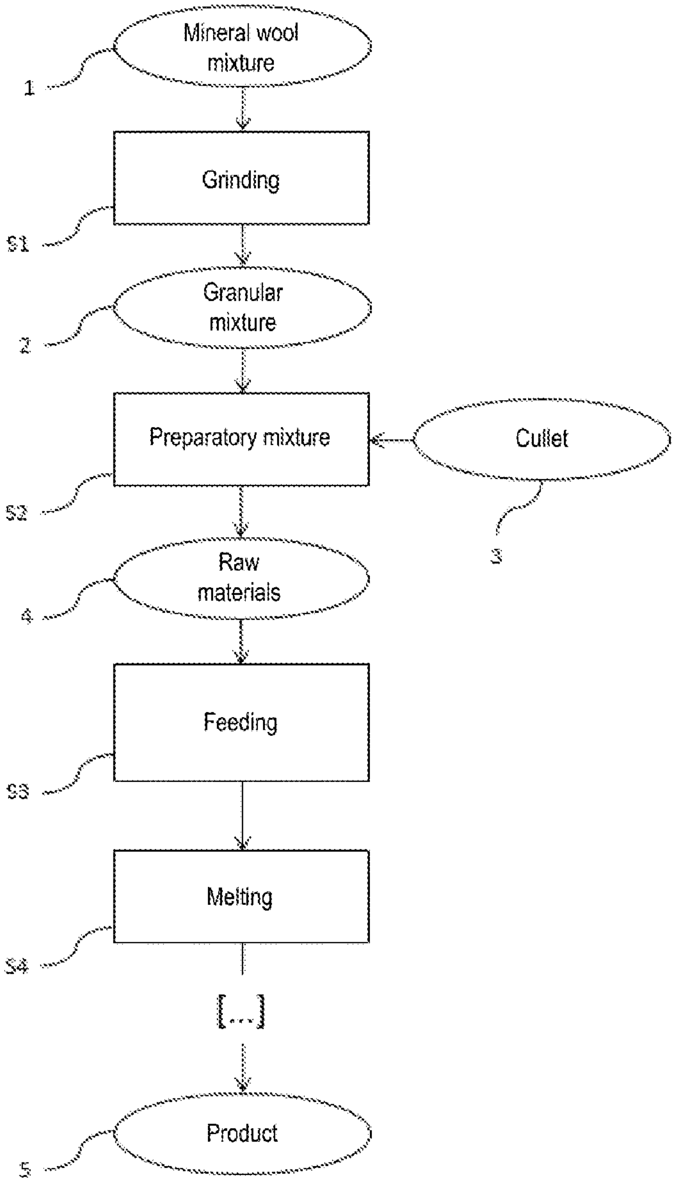
Mineral wool mixture
1
Grinding
S1
Granular mixture
2
Preparatory mixture
Cullet
S2
3
Raw materials
4
Feeding
S3
Melting
S4
[...]
Product
5

PREPARATION OF A RAW MATERIAL COMPOSITION

CROSS-REFERENCE TO RELATED APPLICATIONS

This application is the U.S. National Stage of PCT/FR2021/051638, filed Sep. 23, 2021, which in turn claims priority to French patent application number 2009691 filed Sep. 24, 2020. The content of these applications are incorporated herein by reference in their entireties.

The present invention relates to a method for preparing a raw material composition suitable for firing in a glass furnace. The invention also relates to the raw material composition thus obtained, as well as to a method for melting this composition. Finally, the invention relates to a method for the production of cullet, glass wool and/or rock wool, textile glass yarns and/or flat glass, or hollow glass (bottles, flasks, etc.) or following said method for melting.

More particularly, a raw material composition according to the invention is obtained from a mineral wool mixture. In the sense of the invention, such a mineral wool mixture comprises one or more types of mineral fibers originating from the production of said fibers (factory waste), from building sites (construction site waste or demolition site waste) and/or from recycling channels allowing the recovery of such fibers from end products, whether or not they have been used. Indeed, the various stages of mineral wool production generate a certain amount of waste that enters the composition of said mineral wool mixture. This waste may come from the cutting of products (and/or discarded products), for example, and then contain large quantities of organic materials such as resins called "binders" and intended to ensure the mechanical cohesion of the fibrous mats. Other types of materials can be combined with mineral fibers, e.g. paper, aluminum or bituminous films, or wooden pallet parts. Such mineral fibers may in particular consist of glass and/or rock. They are then known as glass wool and rock wool, respectively. These mineral fibers are usually combined with organic binders and other metallic and/or organic materials.

In this context, and as described in the text of patent EP177139161, it is known to "recycle" such a mineral wool mixture by melting it in a glass furnace, so as to produce cullet or in other words, a mineral material suitable for use as a vitrifiable raw material in a subsequent glass melting process. Among the many advantages of such a recycling of mineral wool waste is the improvement of the energy efficiency of the glass furnace, as the collected mineral wool mixture and/or the cullet resulting from its melting is easier to melt than a "conventional" raw material composition comprising, among others, large quantities of silica.

Despite these advantages, it has been found by the inventors that in practice, such a mineral wool mixture takes up a considerable volume when introduced into the furnace, for example via a screw feeder. At constant feeding volume, compared to a so-called "traditional" raw material composition, the use of a raw material composition consisting of such a mineral wool mixture tends to significantly reduce the mass of raw material introduced into the furnace per unit of time. In other words, the use of such a mixture of mineral wool as a raw material accordingly reduces the feed rate of the furnace, and therefore the efficiency thereof, which, in an industrial context, can prove to be a prohibitive disadvantage.

A natural solution to this technical problem is to increase the capacity of the raw material feeding means, for example by using a larger screw feeder. However, this solution is not without disadvantages, since it entails a structural modification to the feeder and, more generally, makes its size dependent on the nature of the composition being fed.

The claimed invention is intended to provide a technical solution to the disadvantages described hereinbefore. More particularly, in at least one embodiment, the proposed technique relates to a method for preparing a raw material composition adapted to be fed into the melting chamber of a facility adapted to obtain cullet, glass wool and/or rock wool, textile glass yarns, flat glass and/or hollow glass, said method being characterized in that it comprises at least one step of grinding a mineral wool mixture adapted to enter into the raw material composition, such that the granular mixture obtained after grinding has a bulk density greater than or equal to 30 kg/m3.

Throughout the description, the term "bulk density" refers to the mass of the crushed mixture per unit of total volume, including the interstitial spaces separating the aggregates (grains) that make up this mixture. For the purposes of the invention, this bulk density is measured according to a procedure described in the description, or by any procedure that allows equivalent results to be obtained.

The mineral wool mixture being ground comprises one or more types of mineral fibers originating from the production of said fibers, from construction sites (construction or demolition) and/or from recycling channels allowing the recovery of such fibers from end products, whether or not they have been used. Such mineral fibers may in particular consist of glass and/or rock. They are then known as glass wool and rock wool, respectively.

A preparation method according to the invention makes it possible to increase the bulk density of the mineral wool mixture by grinding, and thus to obtain a granular mixture which can be fired in a so-called "traditional" glass furnace at a satisfactory feed rate. As detailed in the description, the use of such a granular mixture makes it possible, in particular, under standard feeding conditions below the level of the glass melt, to achieve feed rate values greater than or equal to 5 tons per day. The choice of such a minimum value of bulk density takes into account, in particular, the difference observed empirically between the theoretical value of the feed rate and the actual value of such a rate measured under standard operating conditions.

According to a particular embodiment, the granular mixture obtained has a bulk density greater than or equal to 50 kg/m3, preferably greater than or equal to 70 kg/m3, preferably greater than or equal to 90 kg/m3, preferably greater than or equal to 100 kg/m3.

The increase in the bulk density of the granular mixture increases the feed rate of the furnace, and thus the productivity of the furnace.

According to a particular embodiment, the granular mixture obtained after grinding has a bulk density less than or equal to 500 kg/m3.

As detailed in the description, the implementation of a melting test campaign on a submerged burner furnace revealed that above a certain value of bulk density, part of the raw material composition introduced tends, due to its high volatility, to be expelled with the flue gases, which complicates the work of treating those gases, reduces the productivity of the furnace, and consequently represents a major industrial disadvantage. In this respect, and as detailed in the description, the use of a granular mixture with a bulk density less than or equal to 500 kg/m3 makes it possible to maintain an acceptable granular mixture flue loss rate, since the percentage is less than 3%.

According to a particular embodiment, the granular mixture obtained has a bulk density less than or equal to 400 kg/m3, preferably less than or equal to 300 kg/m3, more preferably less than or equal to 220 kg/m3.

Limiting the bulk density of the granular mixture makes it possible to reduce the flue loss percentage of the raw materials, thus facilitating the treatment of the flue gases.

According to a particular embodiment, the mass proportion of said granular mixture relative to the total mass of said raw material composition is greater than or equal to 5%, preferably greater than or equal to 20%, preferably greater than or equal to 40%, preferably greater than or equal to 60%, preferably greater than or equal to 70%, preferably greater than or equal to 80%, preferably greater than or equal to 90%, preferably greater than or equal to 95%, preferably greater than or equal to 99%.

According to a particular embodiment, the preparation method comprises a step of adding cullet to said granular mixture, the mass of the cullet being greater than or equal to 1% of the total mass of the granular mixture.

It has been observed by the inventors that the addition of cullet to the granular mixture, i.e. after grinding, tends to modify its rheological behavior and thus to facilitate its transport, in particular during the feeding of the raw materials. This is called "fluidization" of the granular mixture. The minimum proportion of 1% corresponds to the minimum threshold for noticing this fluidization effect of the granular mixture.

The introduction of cullet has the additional advantage of allowing it to be treated for further use, for example by removing undesirable chemical compounds in a submerged burner furnace.

According to one particular embodiment, the mass of cullet is less than or equal to 20% of the total mass of the granular mixture.

As cullet is itself produced by melting raw materials, at a significant energy cost, the addition and therefore the melting of cullet in proportions greater than 20% of the total mass of the granular mixture would tend to reduce the energy efficiency of the process as a whole by unacceptable degrees.

According to one particular embodiment, said added cullet has a granularity of between 1 and 5 mm.

In this text, "granularity" means the size of the aggregate as determined by sieving. Choosing a cullet granularity range between 1 and 10 mm optimizes the fluidization of the granular mixture by the cullet.

According to one particular embodiment, the preparation method comprises a preliminary step of determining a desired bulk density value of the ground granular mixture, as a function of the dimensional characteristics of a feeder to be used, and/or a desired feed rate value.

By previously determining and subsequently taking into account a desired density value, the method of preparing the raw material composition can be adjusted to achieve a targeted feed rate, by using a feeder with known dimensional characteristics.

According to a particular embodiment, said mineral wool mixture has a moisture content greater than 1% of the total mass of said mixture.

As detailed in the description, a campaign of tests on a grinding machine has confirmed that increasing the moisture content of the mineral wool mixture makes it possible to further increase the bulk density of the granular mixture obtained after grinding, independently of the mass supply linked to the addition of water. Indeed, water acts as a binder by creating capillary bridges between the fibers, which allows the latter to bind together better.

In a particular embodiment, water is supplied prior to and/or during grinding, for example by spraying.

An additional advantage of the humidification of the mineral wool mixture during the grinding process is that dust emissions are reduced.

According to one particular embodiment, said mineral wool mixture has a moisture content greater than 2%, preferentially greater than 3%.

Increasing the moisture content further increases the bulk density of the granular mixture. In the case of conveying the granular mixture on a belt, an upper limit of 25% corresponds to the threshold above which the granular mixture tends to stick to the conveyor belt and thus block and/or damage it.

According to one particular embodiment, the preparation method uses at least one grinder equipped with a screen whose mesh size is less than 20 mm.

The choice of such a mesh size makes it possible to obtain a granular mixture with a bulk density greater than or equal to 30 kg/m3.

According to one particular embodiment, the mesh size of said screen is less than 20 mm, preferably less than 15 mm, preferably less than 10 mm.

The choice of an increasingly smaller mesh size leads to a granular mixture with an increasingly higher density.

According to one particular embodiment, the grinder is adapted to rotate at a speed greater than 150 rpm, preferably greater than 175 rpm, more preferably greater than 200 rpm.

The yield of the grinder tends to increase with the rotational velocity of its drum.

According to one particular embodiment, said ground mineral wool mixture comprises, excluding gluing:

$SiO_2$: 30 to 75% by weight,
CaO+MgO: 5 to 40% by weight,
$Al_2O_3$: 0 to 30% by weight,
$Na_2O+K_2O$: 0 to 20% by weight,
Iron oxide: 0 to 15% by weight.

According to one particular embodiment, said ground mineral wool mixture consists of a rock wool (also called "black glass" by the person skilled in the art) which comprises, excluding gluing:

$SiO_2$: 30 to 50% by weight,
$Al_2O_3$: 10 to 22% by weight,
CaO+MgO: 20 to 40% by weight,
Iron oxide: 3 to 15% by weight,
$Na_2O+K_2O$: 1 to 10% by weight.

According to one particular embodiment, said ground mineral wool mixture consists of a glass wool which comprises, excluding gluing:

$SiO_2$: 50 to 75% by weight,
$Al_2O_3$: 0 to 8% by weight,
CaO+MgO: 5 to 20% by weight,
Iron oxide: 0 to 3% by weight,
$Na_2O+K_2O$: 12 to 20% by weight,
$B_2O_3$: 2 to 10% by weight.

According to one particular embodiment, said ground mineral wool mixture comprises, excluding gluing:

$SiO_2$: 39 to 44% by weight,
$Al_2O_3$: 16 to 27% by weight,
CaO: 6 to 20% by weight,
MgO: 1 to 5% by weight,
$Na_2O$: 0 to 15% by weight,
$K_2O$: 0 to 15% by weight,
$Na_2O+K_2O$: 12 to 20% by weight,
$P_2O_5$: 0 to 3% by weight, Fe2O3: 1.5 to 15% by weight
B2O3: 0 to 2% by weight,
TiO2: 0 to 2% by weight.

The invention also relates to a raw material composition adapted to be fed into the melting chamber of an installation adapted to obtain cullet, glass wool and/or rock wool, textile glass yarns, flat glass and/or hollow glass obtained preferably by means of such a preparation method, characterized in that it comprises a granular mixture whose bulk density is greater than or equal to 30 kg/m3.

According to a particular embodiment, the granular mixture has a bulk density greater than or equal to 50 kg/m3, preferably greater than or equal to 70 kg/m3, preferably greater than or equal to 90 kg/m3, preferably greater than or equal to 110 kg/m3.

According to a particular embodiment, the granular mixture has a bulk density less than or equal to 500 kg/m3, preferably less than or equal to 400 kg/m3, preferably less than or equal to 300 kg/m3, preferably less than or equal to 200 kg/m3, preferably less than or equal to 160 kg/m3, preferably less than or equal to 140 kg/m3.

According to a particular embodiment, the raw material composition comprises at least 30% by weight of granular mixture, preferably at least 60% by weight, still more preferably at least 80% by weight, still more preferably at least 90% by weight, still more preferably at least 95% by weight, still more preferably at least 98% by weight of granular mixture.

According to a particular embodiment, the raw material composition comprises a mass of cullet of at least 1% of the total mass of the granular mixture.

According to one particular embodiment, the mass of cullet is less than or equal to 20% of the total mass of the granular mixture.

The invention also relates to a process for melting such a raw material composition, for obtaining cullet, glass wool and/or rock wool, textile glass yarns and/or flat glass/hollow glass.

According to a particular embodiment, said raw material composition is fed by means of a feed screw, preferably fed from a buffer silo containing said raw material composition.

Compared to a piston, which operates in feed cycles, an endless screw allows for continuous feeding, which is particularly useful when feeding below the level of the glass melt.

The use of a buffer silo, preferably equipped with a scale at the outlet, allows the mass fed into the feeding machine to be regulated precisely.

According to a particular embodiment, said raw material composition is fed at a feed rate greater than or equal to 5 tons per day.

According to a particular embodiment, said raw material composition is fed at a feed rate greater than or equal to 7 tons per day, preferably greater than or equal to 9 tons per day, preferably greater than or equal to 10 tons per 25 day.

The total yield of the furnace increases with its feed rate, hence the interest in increasing it. The use of a raw material composition according to one of claims 7 and 8 makes it easier to achieve such feed rate values.

According to a particular embodiment, the bulk density of the granular mixture is measured periodically, manually and/or automatically.

According to a particular embodiment, the bulk density of the granular mixture is adjusted manually and/or automatically, depending on the desired feeding rates.

According to a particular embodiment, said raw material composition is fed below the level of the glass melt, and preferably in that said melting method employs a melting chamber equipped with submerged burners.

In the description, the terms “liquid glass” and “glass melt” refer to the product of the melting of these vitrifiable materials introduced into the glass furnace. For the purposes of the invention, “submerged burners” are burners configured so that the flames they generate and/or the combustion gases produced develop within the glass melt itself. Generally, they are arranged so that they are flush with the bottom so that the flame develops within the mass of vitrifiable materials being liquefied (melted). They can thus be passed through its side walls, the bottom wall and/or suspended from above, by hanging them from the vault or from any suitable superstructure. These burners can be such that their gas supply lines are flush with the wall through which they pass. It may be preferable for these ducts to at least partially “enter” into the mass of the vitrifiable materials, so as to avoid the flames being too close to the walls and causing premature wear of the refractory materials. It is also possible to choose to inject only the combustion gases, the combustions being carried out outside the melting chamber itself.

The use of a submerged burner furnace allows a considerable increase in production yield compared to “conventional” melting. Indeed, melting by submerged burners creates convective mixing within the vitrifiable materials being liquefied. This mixture of materials which are not yet liquefied and those which are already molten is very efficient and allows melting to take place, with vitrifiable materials of identical chemical composition, at a lower temperature and/or much faster than with traditional heating means. The very favorable characteristics of an “agitated” melt are thus achieved, without having to resort to unreliable and/or rapidly wearing mechanical stirring means. This is very interesting because of the reduction in the energy cost of the furnace, but also because of the choice of refractory materials used in the manufacture of the installations: since they get less hot, they corrode less quickly.

According to a particular embodiment, said raw material composition is fed above the level of the glass melt, and preferably in that said melting method employs a melting chamber equipped with flame burners arranged above the level of the glass melt.

The advantage of feeding said raw material composition above the level of the glass melt is that the organics present in said composition can be burned before they are introduced into the glass melt, thus making use of the additional energy source that these organics constitute while limiting pollution of the glass melt.

In this context, the reduction in the thickness of the batch fed on the surface of the glass melt facilitates its melting while limiting the risks of particles flying out through the chimney(s). A composition according to the invention is therefore particularly suitable since it has a reduced volume and therefore a reduced thickness, for an equivalent mass.

The invention also relates to a method for manufacturing cullet, glass and/or rock wool, textile glass yarns, flat glass and/or hollow glass, comprising such a melting method.

As discussed in this text, the implementation of such a melting method makes it possible to achieve particularly advantageous manufacturing yields.

The invention also relates to cullet, glass and/or rock wool, textile glass yarns, flat glass and/or hollow glass obtained according to such a manufacturing method.

Further features and advantages of the invention will become apparent from the following description of particular embodiments, given merely as illustrative and non-limiting examples, and from the attached FIG. 1 [FIG. 1]

which is a flowchart illustrating a method for manufacturing cullet, glass wool and/or rock wool, textile glass yarns, flat glass and/or hollow glass, according to a particular embodiment of the invention.

Throughout the description, including FIG. 1, reference numbers that are identical represent similar or identical elements, unless otherwise indicated.

It is further understood that the present invention is in no way limited by the particular embodiments described and/or depicted, and that other embodiments are perfectly possible.

FIG. 1 is a flow diagram illustrating a method for manufacturing a glass product (5), according to a particular embodiment of the invention. In a conventional manner, raw materials (4) obtained at least in part from a mineral wool mixture (1) are fed (step S3) into a glass furnace in order to be melted (step S4) and subsequently processed into a glass product (5).

According to known methods, the molten mixture can alternatively be cooled and fragmented to obtain cullet, formed into fibers to obtain glass wool or rock wool, spun into glass textile yarns and/or poured onto a tin float to obtain flat glass, each of these industrial applications being designated by the expression "glass product (5)" throughout the description.

According to a particular embodiment of the invention, such a manufacturing method comprises melting a raw material composition (4) obtained at least in part from a granular mixture (2) whose bulk density is greater than or equal to 30 kg/m3.

According to an easily reproducible procedure for measuring the bulk density of the granular mixture (2), the latter is first poured into a container, for example a bucket, of known mass and volume. The container must be at least liters in size in order to have sufficient precision and to respect an aspect ratio that limits the settling of the mixture, by satisfying the formula:

$$L_{max} \leq 2\sqrt[3]{V} \quad \text{[Math. 1]}$$

Wherein $L_{max}$ is the maximum extent of the container in a given direction, by analogy with the Feret diameter of a particle, and V is the volume of said container.

It is also important to ensure that the mixture is poured gently, without any movement of the bucket or mechanical compression of the mixture, in order to minimize the settling of the mixture. The filled bucket is then weighed to determine the mass of the poured mixture. The bulk density is the ratio of the measured mixture mass to the volume of the bucket.

It should be noted that such a method of characterizing bulk density is significantly more accurate and rigorous than any alternative method that simply estimates the size of a fiber agglomerate, also known as a "flake". Indeed, any mineral wool mixture (1) can be seen as an agglomerate of mineral fibers, of expandable or compressible volume, which can itself be divided into a plurality of agglomerates of smaller and/or of lower density fibers. In the absence of additional information, the size of a mineral fiber agglomerate is therefore not usable as data to characterize a product and/or to compare two products.

In order to estimate more precisely the value of the glass feed rate as a function of the variations of various operational parameters of a furnace and of the bulk density of the loaded composition, the inventors carried out a test campaign of conveying two batches of glass wool waste having respectively bulk densities of 20 kg/m3 and 110 kg/m3.

Two types of tests were implemented:

"cold" tests, in which a screw feeder is fed for a given period of time with glass wool waste which is then collected at the exit of the feeder and weighed, in order to deduce the mass flow rate of the feeder.

so-called "hot" tests, for which the same batch charger is arranged at the entrance of a working melting furnace. A known mass of waste is fed and the time taken to feed the total quantity is recorded in order to calculate the feed rate.

For both tests, the endless feed screw has a diameter and a pitch of 30 cm. The filling rate is 100%, with the screw loading hopper being filled to ensure constant feeding.

In parallel to these two industrial tests, theoretical feed rate values are calculated under the same operational conditions and based on the following formula, which gives an approximation of the feed rate Q carried by the screw (in kg/s):

$$Q=r*d*V*\pi*R^2*H,$$

where r is the filling rate of the screw, d is the density of the mixture fed (in kg/s), V is the rotational speed of the endless screw (in $s^{-1}$, 10 rpm under standard feeding conditions), R is the radius of the screw (in m) and H is the value of the screw pitch (in m).

Table 1 [Table 1] below shows the results obtained for four glass wool samples with different bulk densities. These four samples are fed into the furnace via the endless screw at different screw rotation speeds.

TABLE 1

Variation of the feed rate as a function of different operational parameters of a furnace and the bulk density of the composition being fed in

| Sample number | Bulk density in kg/m3 | Screw speed in rpm | Feed rate in kg/h Theory | Feed rate in kg/h Cold tests | Feed rate in kg/h Hot tests | Ratio Hot/Theory in % |
|---|---|---|---|---|---|---|
| 1 | 20 | 10 | 232 | 216 | 150 | 65 |
| 2 | 110 | 2 | 248 | 254 | 147 | 59 |
| 3 | 110 | 3 | 372 | 360 | 283 | 76 |
| 4 | 110 | 4 | 495 | 492 | 383 | 77 |

Comparing the theoretical feed rate values and the results obtained with the cold tests, a negligible difference is observed. The screw transport theory (theoretical values) can therefore give a relatively accurate estimate of the cold results.

On the other hand, when comparing the theoretical values of feed rate and the results obtained with the tests carried out in hot conditions, a significant reduction in feed rate is surprisingly observed, of between 20% and 40% of the theoretical value. Several hypotheses could possibly justify such a difference in values, observed empirically, including the pressure exerted by the glass melt on the mixture to be loaded, and/or the rise of combustion gases from the furnace, these gases then occupying part of the space available in the screw.

Accounting for such a discrepancy has a direct application in industrial reality. For example, it is commonly accepted that for reasons of melting furnace profitability, the minimum feed rate of raw materials into the furnace should be 5 tons per day, or 208 kg/h. If a person skilled in the art sticks to the theory or to the results obtained in cold tests, i.e. in tests that are significantly easier to carry out than hot tests, they will come to the conclusion that under standard loading conditions, the use of glass wool waste with a bulk density of kg/m3 is sufficient to obtain a loading rate of 232 kg/h, i.e. a satisfactory rate.

And yet, this is not the case. The hot tests carried out on sample number 1 (see Table 1) show that the feed rate actually obtained is 150 kg/m3, i.e. a flow rate well below the set criterion.

For equivalent operational conditions, and taking into account a maximum deviation of 40%, the bulk density necessary to obtain a feed rate of 208.8 kg/m3, i.e. a value almost equal to the minimum threshold set, is in fact kg/m3.

Obtaining this threshold value of bulk density is not obvious, since it is the result of a series of complex (hot) tests carried out by the inventors.

In order to increase the bulk density of the granular mixture, the inventors used a standard industrial manufacturing grinder, and carried out a test campaign during which three batches of glass wool waste were ground up before the bulk density of the granular mixtures obtained was measured for each of these batches. The objective of this campaign was in particular to evaluate the influence of the various parameters of the grinder and the wetting rate on the bulk density of the ground mineral wool mixture.

A first batch consisted of standard glass wool panels only.

A second batch corresponds to this first batch to which 8.8 kg of moistened glass wool waste was added.

A third batch corresponds to this second batch to which 6.4 kg of moistened glass wool waste was added.

On the basis of these three batches, five (5) tests were implemented. Tests 1 to 3 being carried out with the first batch, varying the settings of the grinder. Test number 4 was implemented with the second batch, and test number 5 was implemented with the third batch.

Table 2 [Table 2] below presents the results obtained for each of these tests. In the absence of further clarification, all parameters not specified in this table are the same between each of these tests.

TABLE 2

Variation of the bulk density of ground glass wool waste as a function of the operational parameters of the grinding machine and the wetting rate of the ground mixture.

| Test number | Mesh size in mm | Speed in rpm | Capacity in kg/h | Bulk density in kg/m3 |
|---|---|---|---|---|
| 1 | 10 | 150 | 288 | 110 |
| 2 | 15 | 150 | 414 | 64 |
| 3 | 15 | 210 | 454 | 68 |
| 4 | 10 | 210 | 554 | 142 |
| 2 | 10 | 210 | 776 | 223 |

Comparing the results of tests 1 and 2, it is observed that reducing the mesh size of the grinder screen from 15 mm to 10 mm increases the bulk density of the granular mixture obtained by 72%, as well as the capacity of the grinder by 9.6%.

Comparing the results of tests 2 and 3, it can be seen that increasing the rotation speed of the drum from 150 to 210 rotations per minute (rpm) increases the bulk density of the resulting granular mixture by 6.5%.

Comparing the results of tests 1 and 4, it can be seen that the addition of moistened waste material to the ground glass wool mixture increases the bulk density of the resulting granular mixture and the capacity of the grinder. This is confirmed by the comparison of tests 4 and 5, where it is observed that increasing the proportion of wet waste further increases the bulk density of the ground mixture and the capacity of the grinder.

The invention claimed is:

1. A raw material composition suitable for being fed into the melting chamber of an installation suitable for obtaining cullet, glass wool and/or rock wool, textile glass yarns, flat glass and/or hollow glass, the raw material composition comprising: a granular mixture comprising ground fibers of a mineral wool mixture, the granular mixture having a bulk density greater than or equal to 70 kg/$m^3$ and less than or equal to 500 kg/$m^3$, and a mass of cullet of at least 1% of the total mass of the granular mixture;

wherein said mineral wool mixture of said ground fibers has a moisture content greater than 1% of the total mass of said mixture, the moisture being water.

2. A method for obtaining cullet, glass wool and/or rock wool, textile glass yarns and/or flat glass/hollow glass, the method comprising melting the raw material composition of claim 1.

3. The method according to claim 2, wherein said raw material composition is fed by a screw feeder to a furnace in which said melting occurs.

4. The method according to claim 2, wherein said raw material composition is fed at a feed rate greater than or equal to 5 tons per day.

5. The method according to claim 2, wherein said raw material composition is fed below a level of the glass melt.

6. The method according to claim 2, wherein said raw material composition is fed above a level of the glass melt.

7. Cullet, glass wool and/or rock wool, textile glass yarns, flat glass and/or hollow glass obtained through a manufacturing method according to claim 2.

8. The method according to claim 3, wherein said raw material composition is fed from a buffer silo containing said raw material composition.

9. The method according to claim 5, wherein said melting method employs a melting chamber equipped with submerged burners.

10. The method according to claim 6, wherein said melting method employs a melting chamber equipped with burners arranged above the level of the glass melt.

11. The raw material composition according to claim 1, wherein a mass proportion of said granular mixture relative to a total mass of said raw material composition is greater than or equal to 5%.

12. The raw material composition according to claim 11, wherein the mass proportion of said granular mixture relative to the total mass of said raw material composition is greater than or equal to 90%.

13. The raw material composition according to claim 11, wherein the mass proportion of said granular mixture relative to the total mass of said raw material composition is greater than or equal to 99%.

14. The raw material composition according to claim 1, wherein said granular mixture is obtained from grinding a mineral wool mixture.

15. The raw material composition according to claim 1, wherein the mass of cullet is less than 20% of the total mass of the granular mixture.

16. The raw material composition according to claim 15, wherein the cullet has a granularity between 1 and 10 mm.

17. The raw material composition according to claim 16, wherein the granularity of the cullet is between 1 and 5 mm.

18. The raw material composition according to claim 15, wherein the mass proportion of said granular mixture relative to the total mass of said raw material composition is greater than or equal to 90%.

19. A raw material composition suitable for being fed into the melting chamber of an installation suitable for obtaining cullet, glass wool and/or rock wool, textile glass yarns, flat glass and/or hollow glass, the raw material composition comprising: a granular mixture comprising ground fibers of a mineral wool mixture, the granular mixture having a bulk density greater than or equal to 70 $kg/m^3$ and less than or equal to 300 $kg/m^3$;

wherein said mineral wool mixture of said ground fibers has a moisture content greater than 1% of the total mass of said mixture, the moisture being water.

20. The raw material composition according to claim 19, further comprising a mass of cullet of at least 1% and less than 10% of the total mass of the granular mixture.

21. The raw material composition according to claim 20, wherein the mass proportion of said granular mixture relative to the total mass of said raw material composition is greater than or equal to 90%.

22. The raw material composition according to claim 1, further comprising capillary bridges between the fibers created by the water to bind the fibers.

23. The raw material composition according to claim 19, further comprising capillary bridges between the fibers created by the water to bind the fibers.

24. The raw material composition according to claim 1, the granular mixture having a bulk density greater than or equal to 90 $kg/m^3$.

25. The raw material composition according to claim 24, the granular mixture having a bulk density greater than or equal to 110 $kg/m^3$.

26. The raw material composition according to claim 25, the granular mixture having a bulk density less than or equal to 300 $kg/m^3$.

27. The raw material composition according to claim 19, the granular mixture having a bulk density greater than or equal to 90 $kg/m^3$.

28. The raw material composition according to claim 27, the granular mixture having a bulk density greater than or equal to 110 $kg/m^3$.

29. The raw material composition according to claim 28, the granular mixture having a bulk density less than or equal to 300 $kg/m^3$.

* * * * *